(12) United States Patent
Fujinaka et al.

(10) Patent No.: US 7,782,533 B2
(45) Date of Patent: Aug. 24, 2010

(54) IMAGE STABILIZING APPARATUS

(75) Inventors: Hiroyasu Fujinaka, Osaka (JP); Takashi Koike, Hyogo (JP); Takumi Kuwahara, Nara (JP); Atsushi Hasegawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/672,385

(22) Filed: Feb. 7, 2007

(65) Prior Publication Data

US 2007/0188868 A1  Aug. 16, 2007

(30) Foreign Application Priority Data

Feb. 10, 2006  (JP) .............................. 2006-033371

(51) Int. Cl.
*G02B 27/64* (2006.01)
(52) U.S. Cl. ..................................................... 359/557
(58) Field of Classification Search .................. 359/557, 359/554
See application file for complete search history.

(56) References Cited

U.S. PATENT DOCUMENTS

| 6,327,433 B1 * | 12/2001 | Ishikawa et al. .............. 396/55 |
| 2006/0127074 A1 * | 6/2006 | Noji ............................ 396/55 |
| 2006/0269262 A1 * | 11/2006 | Shin et al. ..................... 396/55 |

FOREIGN PATENT DOCUMENTS

| JP | 2002-229090 | 8/2002 |
| JP | 2005-221603 | 8/2005 |

* cited by examiner

*Primary Examiner*—Joshua L Pritchett

(57) ABSTRACT

An image stabilizing apparatus of the present invention includes a laminated substrate 19 that has a coil pattern, a hall element 21 fixed to the laminated substrate 19, a magnet 20, a back yoke 22, an opposing yoke 23, and a flexible printed circuit board for wiring the coil pattern on the laminated substrate and the hall element 21, the opposing yoke 23 being stepped (indentation-type recesses 23a, 23b) in a portion opposing the hall element 21. Reduction in size, weight and cost are thereby realized in a lens-shift image stabilizing apparatus.

6 Claims, 9 Drawing Sheets

IMAGE STABILIZING APPARATUS

BACKGROUND OF THE INVENTION

1. Field of the Invention

The present invention relates to a so-called lens-shift image stabilizing apparatus that performs image stabilization by moving some of the lenses in an optical axis direction and a vertical direction. The present invention also relates to a lens barrel that includes such an image stabilizing apparatus, and an image sensing apparatus that includes the image stabilizing apparatus or the lens barrel, and more particularly to an image sensing apparatus such as a video camera or a digital still camera.

2. Description of the Related Art

In recent years, digital still cameras have seen a dramatic improvement in usability, in addition to reductions in size and weight and better image quality. As a result, digital still cameras have become widespread, replacing conventional silver halide cameras. Compared with silver halide cameras, which capture images by exposing an optical image on film, digital still cameras are advantageous in terms of the reduced size and weight of the camera body, given that images are captured with an image sensing device having a small image sensing surface area. However, with digital still cameras, stabilizing the positioning of the camera body is difficult because their smallness and lightness means that the camera shakes readily when holding the camera to take a shot. The camera body moves as a result, blurring the captured image. In view of this, a variety of digital still cameras equipped with an image stabilizing apparatus for reducing the blurring of captured images resulting from the camera body vacillating have been developed and already marketed. A conventional image stabilizing apparatus is disclosed, for example, in patent document 1 (JP 2002-229090A).

FIG. 8 is a perspective view of a conventional image stabilizing apparatus.

As shown in FIG. 8, the conventional image stabilizing apparatus includes a second lens group 113, a pitching frame 115, a yawing frame 116, a second moving frame 102, a laminated substrate 119, yokes 125, and magnets 120.

The second lens group 113 is held by the pitching frame 115. The pitching frame 115 is moveably supported by the second moving frame 102 via the yawing frame 116. The laminated substrate 119, which has coils arranged thereon for driving the pitching frame 115 respectively in the pitching and yawing directions, is fixed to the pitching frame 115.

On the other hand, the yokes 125 are fixed to the second moving frame 102. The magnets 120 are fixed to the yokes 125 opposite the coils.

In such a configuration, driving force is generated between the coils and the magnets 120 as a result of power being applied to the coils according to the amount of camera shake. The pitching frame 115 and the second lens group 113 move as a result of the driving force. Blurring of the optical image can be reduced as a result of the second lens group 113 being moved approximately orthogonally to the optical axis.

With conventional technology, the magnets 120 and the coils needed to be big enough to generate a sufficient driving force to drive the pitching frame 115 and the second lens group 113. However, when the magnets 120 and the coils are made bigger, the image stabilizing apparatus is enlarged. And when the image stabilizing apparatus is enlarged, the lens barrel and the image sensing apparatus are enlarged.

A technique is disclosed in patent document 2 (JP 2005-221603A) as means for solving these problems.

FIG. 9 is an exploded perspective view of an image stabilizing apparatus disclosed in patent document 2. FIG. 10 is a cross-sectional view of a main part in a vicinity of the magnets 120 in the image stabilizing apparatus.

As shown in FIGS. 9 and 10, the magnets 120 are formed with a thick wall portion 120a and a thin wall portion 120b. As shown in FIG. 10, an actuator coil (not shown) is opposed to the thick wall portion 120a, while a hall element 121 used in position detection is opposed to the thin wall portion 120b. Since the hall element 121 protrudes from the surface of the laminated substrate 119, a portion of the hall element 121 is disposed in the recess formed by the thin wall portion 120b. The yoke 125 therefore can be made smaller and thinner. Also, the interval between the magnet 120 and the coil and the interval between the magnet 120 and the hall element 121 can be optimized, and sufficient thrust for an actuator is obtained even with the reduction in size and weight. Also, a flexible printed circuit board 124 is arranged on the laminated substrate 119.

However, with the configuration disclosed in patent document 2, a portion of the magnet processed into an oblong shape needs to be machined off in order to form the thin wall portion 120b of the magnet 120. When the magnet 120 is made with this construction method, processing costs increase because the step of shaving off a portion of the magnet 120 is necessary.

Also, because a portion of the magnet 120 is shaved off, more magnetic material is required to form magnets of the same volume, increasing the relative material cost of the magnets.

SUMMARY OF THE INVENTION

An object of the present invention is to provide an image stabilizing apparatus capable of realizing size, weight and cost reduction. A further object of the present invention is to provide a lens barrel and an image sensing apparatus that include such an image stabilizing apparatus.

An image stabilizing apparatus of the present invention comprises a correction lens that includes at least one lens and is for correcting subject image blur, a holding frame that holds the correction lens, and a correction unit frame that directly or indirectly holds the holding frame movably within a vertical plane to an optical axis of the lens. The correction unit frame includes at least a magnet. The holding frame includes at least a flat coil having a coil pattern for mobilizing the holding frame using a magnetic force of the magnet, and a position detection sensor that detects information for ascertaining a relative position of the holding frame and the correction unit frame using the magnetic force of the magnet. The position detection sensor, the flat coil and the magnet are disposed in the stated order along an optical axis direction of the lens.

According to this configuration, sufficient thrust can be obtained even if a small magnet is used, since the gap between the position detection sensor and the opposing yoke can be secured even if the gap between the flat coil and the magnet is narrowed.

With the image stabilizing apparatus of the present invention, reducing the size and weight of an actuator is possible while securing sufficient thrust, thereby enabling reduction in the size and weight of an image stabilizing apparatus to be realized.

Manufacturing and material costs can also be reduced.

DETAILED DESCRIPTION OF THE INVENTION

Embodiment 1

[1. Configuration and Operation of Image Sensing Apparatus]

Figure 1:
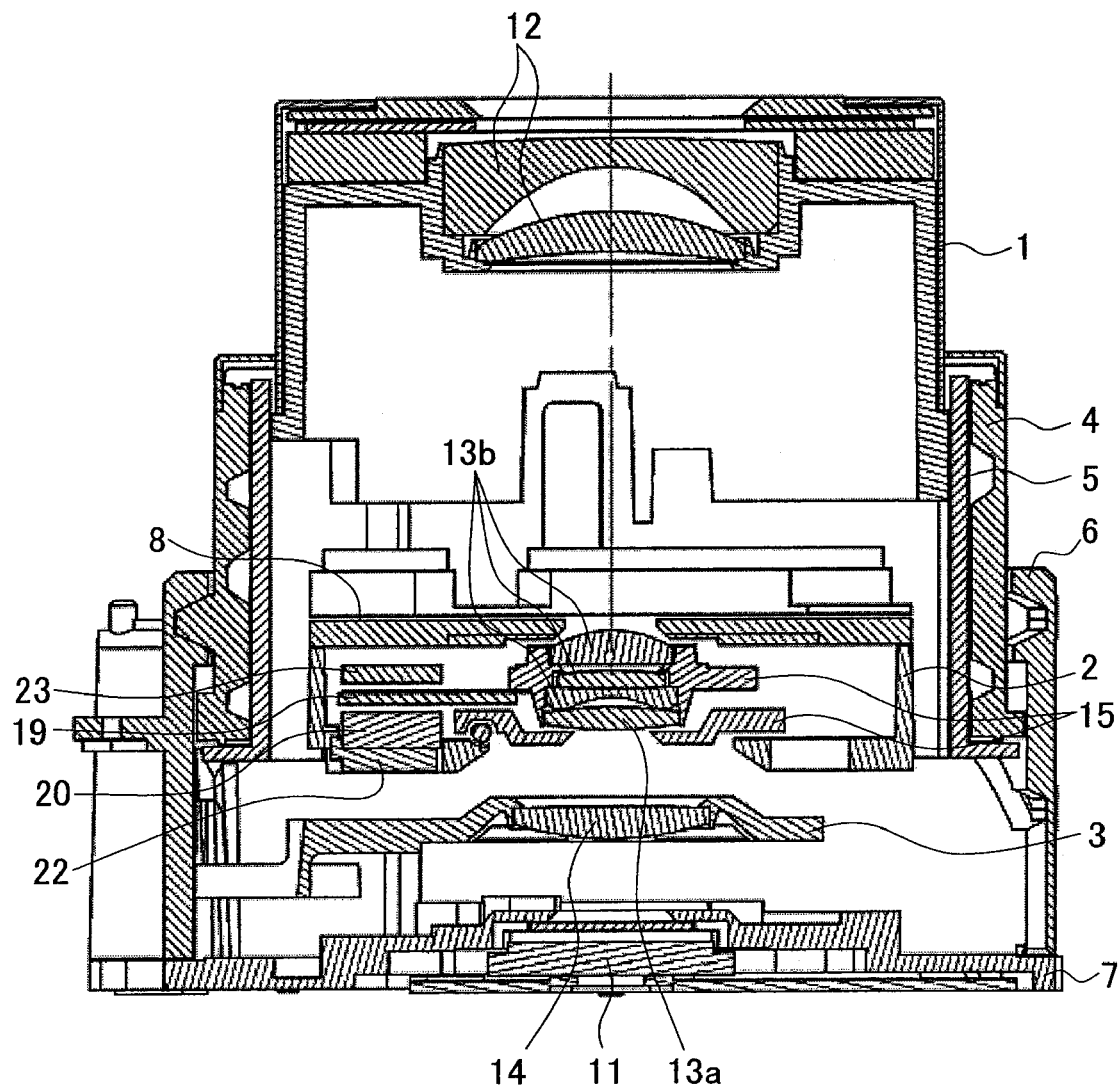
FIG. 1 is a cross-sectional view of a lens barrel according to an embodiment 1.
Figure 2:
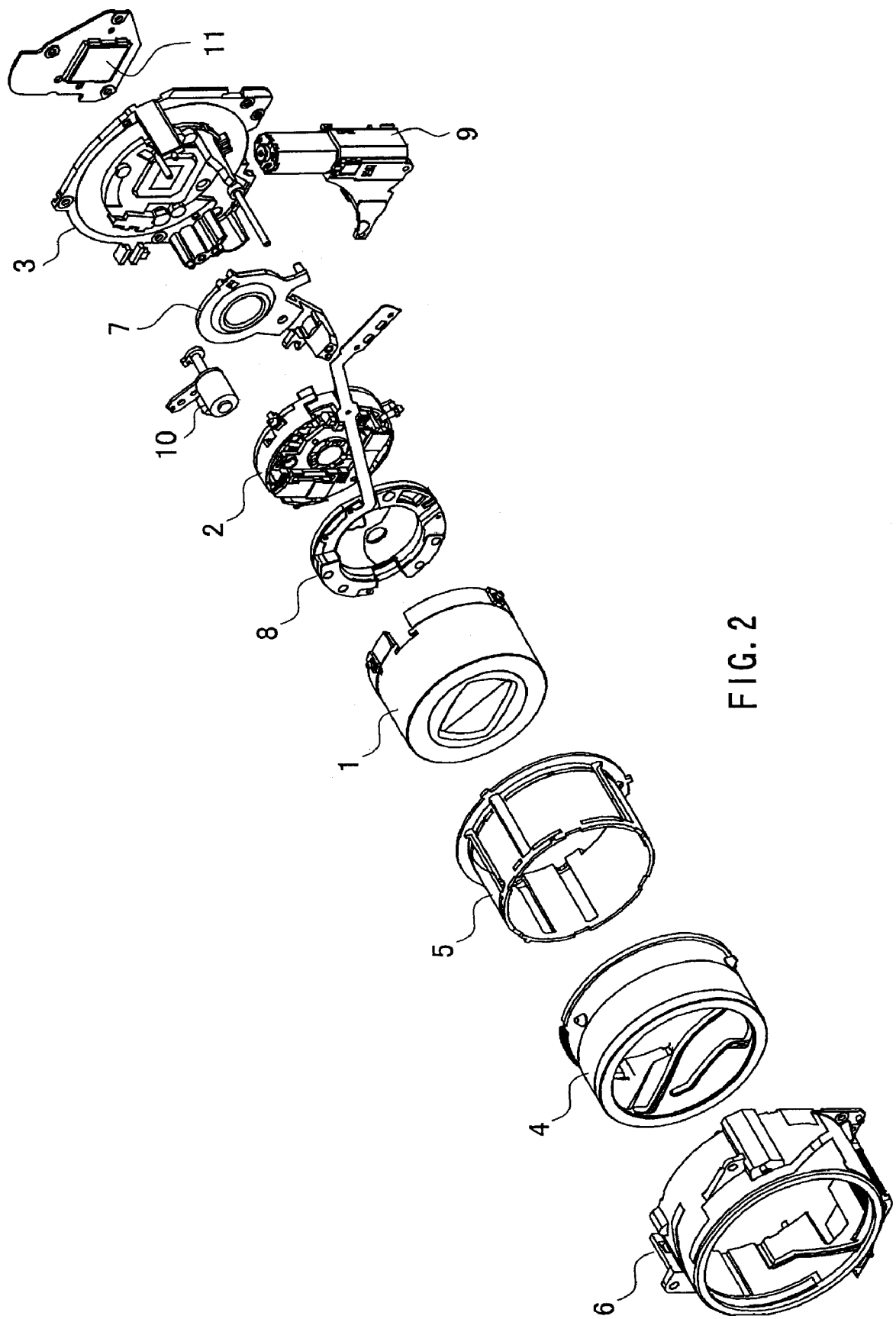
FIG. 2 is an exploded perspective view of the lens barrel according to embodiment 1.

FIG. 1 is a cross-sectional view of a lens barrel according to embodiment 1. FIG. 2 is an exploded perspective view of the lens barrel.

As shown in FIGS. 1 and 2, the lens barrel of embodiment 1 includes a first moving frame 1, a second moving frame 2, a third moving frame 3, a drive frame 4, a through frame 5, a fixed frame 6, and a base unit 7.

The first moving frame 1 holds a first lens group 12 that includes an objective lens. The first moving frame 1 is held movably in the optical axis direction by the drive frame 4.

The second moving frame 2 (holding frame) includes a shutter unit 8, a pitching frame 15, a laminated substrate 19, a magnet 20, a hall element 21 (see FIG. 3), a back yoke 22, an opposing yoke 23 and a flexible printed circuit board 24. The second moving frame 2 is supported by the drive frame 4 so as to be movable in the optical axis direction. The second moving frame 2 holds a second lens group 13.

The third moving frame 3 holds a third lens group 14. The third moving frame 3 is supported by the fixed frame 6 so as to be movable in the optical axis direction. The third moving frame 3 is arranged on the front surface of the base unit 7, and is movable in the optical axis direction. The third moving frame 3 is driven by a stepping motor 10, and is able to perform focusing.

The drive frame 4 has a gear formed on an outer cylindrical surface, and has cam grooves formed on an inner cylindrical surface. The drive frame 4 is driven rotationally around the optical axis as a result of the driving force being transmitted from a DC geared motor 9 to the gear via a gear train. Cam pins formed on the outer cylindrical surface of the first moving frame 1 fit moveably into the cam grooves. Also, cam pins that fit moveably into cam grooves formed in the fixed frame 6 are formed in the outer cylindrical surface of the drive frame 4. As a result of the drive frame 4 thereby being rotationally driven around the optical axis, the first moving frame 1 and the through frame 5 are moved in the optical axis direction, and the drive frame 4 itself moves in the optical axis direction while rotating.

The through frame 5 has grooves formed parallel to the optical axis so as to penetrate from the inner cylindrical surface to the outer cylindrical surface. The cam pins formed on the outer cylindrical surface of the first moving frame 1 are arranged to pass through these grooves. Having passed though the grooves, the cam pins moveably fit into the cam grooves formed in the inner cylindrical surface of the drive frame 4.

The fixed frame 6 forms the outer cylinder of the lens barrel, and rotatably holds the drive frame 4. The fixed frame 6 movably holds the through frame 5 in the optical axis direction, and the first moving frame 1 and the second moving frame 2 (second moving frame group) are disposed on the inner cylindrical surface of the through frame 5. By rotating the drive frame 4 using the driving force transmitted from the DC geared motor 9, the first moving frame 1 and the second moving frame 2 can be moved in the optical axis direction, enabling optical zooming.

The fixed frame 6 is fixed to the front surface of the base unit 7. An image sensing element 11 is fixed to the back surface of the base unit 7. A light beam irradiated from the first lens group 12 side passes through the second lens group 13 and the third lens group 14, and is imaged in the image sensing element 11, with it being possible to image sense an optical image as a result of light being converted to an electrical signal by the image sensing element 11.

[2. Configuration and Operation of Image Stabilizing Apparatus]

Figure 3:
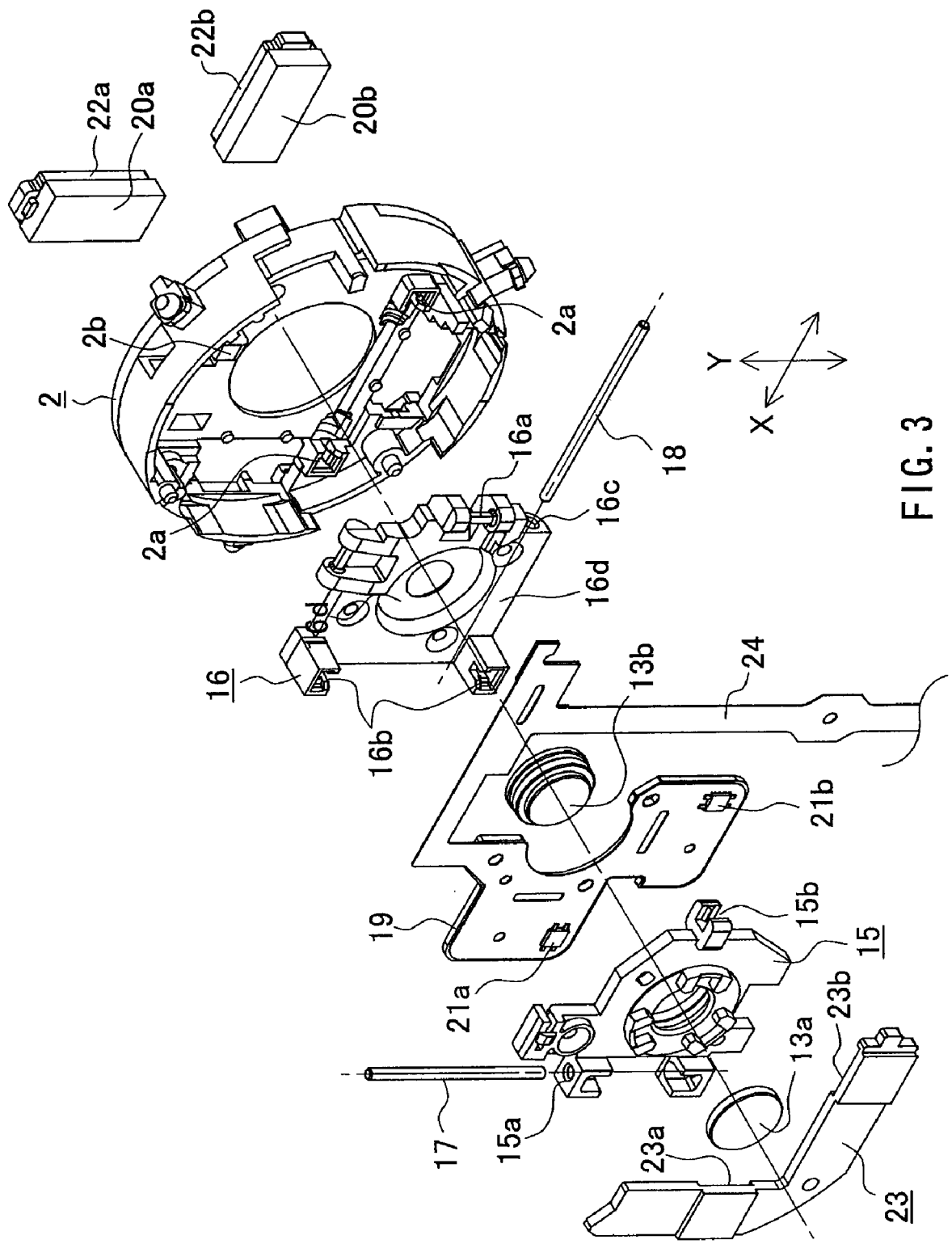
FIG. 3 is an exploded perspective view of an image stabilizing apparatus according to embodiment 1.
Figure 4:
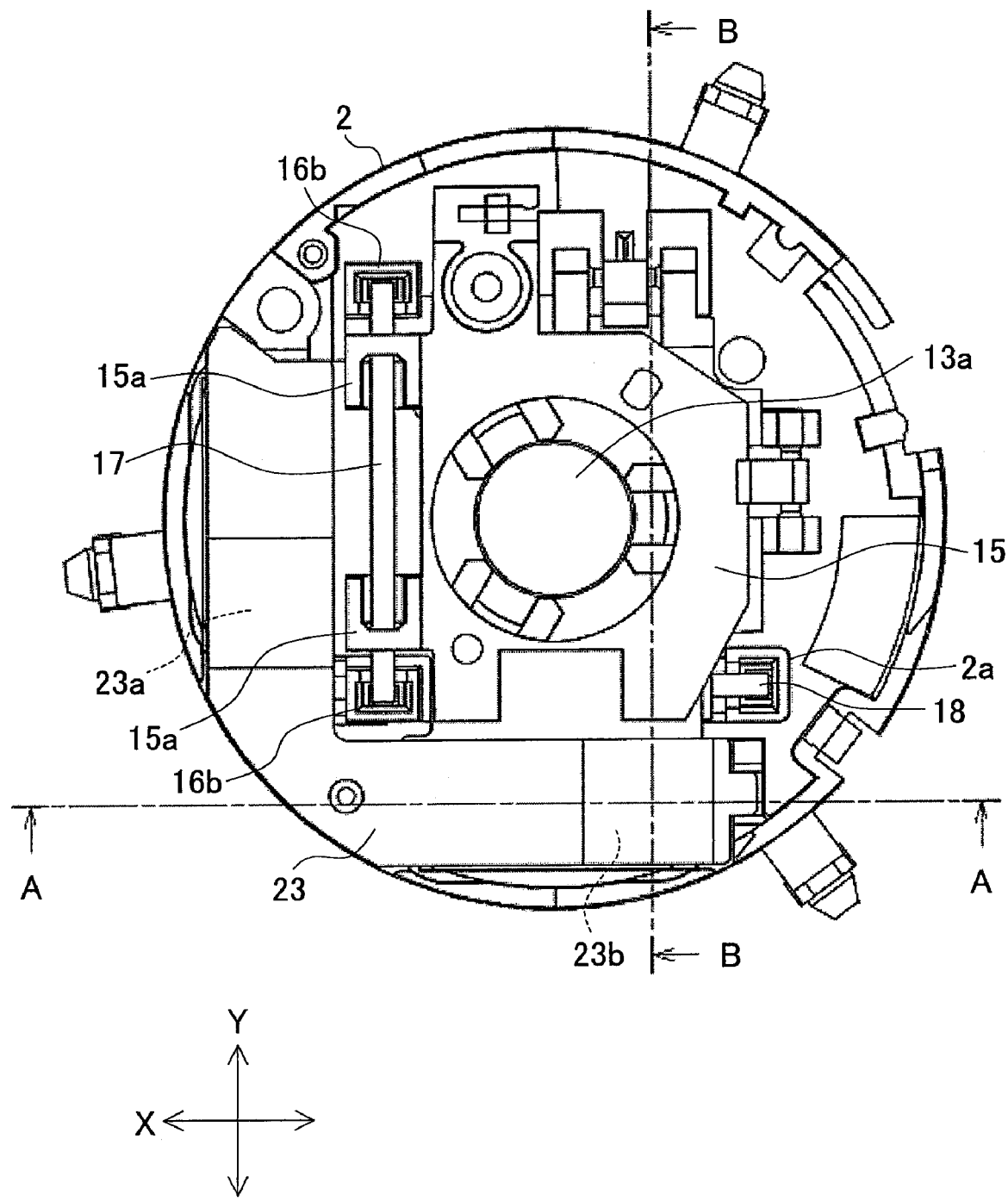
FIG. 4 is a front view of the image stabilizing apparatus according to embodiment 1.
Figure 5:
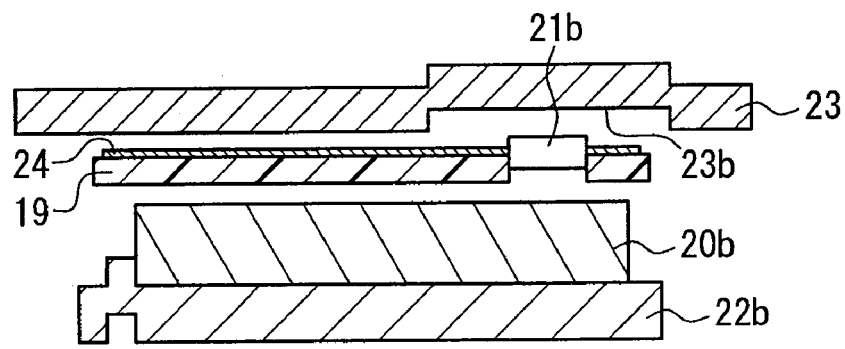
FIG. 5 is a cross-sectional view of an A-A portion of the image stabilizing apparatus according to embodiment 1.
Figure 6:
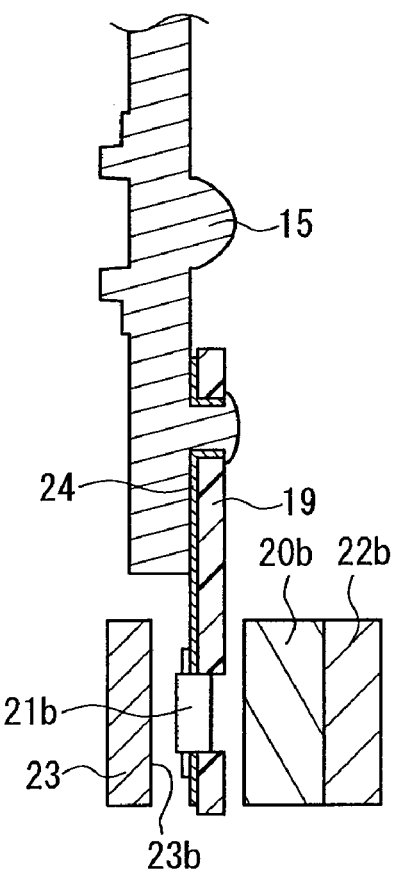
FIG. 6 is a cross-sectional view of a B-B portion of the image stabilizing apparatus according to embodiment 1.

FIG. 3 is an exploded perspective view of an image stabilizing apparatus according to embodiment 1. FIG. 4 is a front view of the image stabilizing apparatus as seen from the second lens group 13 side. FIG. 5 is a cross-sectional view of the A-A portion in FIG. 4. FIG. 6 is a cross-sectional view of the B-B portion in FIG. 4.

In FIG. 3, second lens groups 13a and 13b, the pitching frame 15, a yawing frame 16, a pitching shaft 17, a yawing shaft 18, a laminated substrate 19, magnets 20a and 20b, hall elements 21a and 21b, back yokes 22a and 22b, and an opposing yoke 23 are fitted into the second moving frame 2.

As shown in FIG. 3, the second lens groups 13a and 13b (correction lenses) are for performing image stabilization when shooting. Specifically, image stabilization can be performed by moving the second lens groups 13a and 13b orthogonally to the optical axis and displacing the optical axis so as to correct for the movement of the image sensing apparatus 1. The second lens group 13 is fixed to the pitching frame 15.

The pitching frame 15 is arranged movably in a pitching direction perpendicular (Y direction) to the yawing frame 16. Because the yawing frame 16 is movable in the yawing direction (horizontal or X direction), the second lens group 13 is movable in the pitching and yawing directions. A bearing 15a and a baffle portion 15b are formed on the pitching frame 15. By inserting the pitching shaft 17 into the bearing 15a parallel to the Y axis direction, and engaging a resin portion 16a that is parallel to the Y axis direction with the baffle portion 15b, the pitching frame 15 is arranged movably in the perpendicular (Y direction) direction while movement in the optical axis direction (dashed-dotted line in FIG. 3) is restricted.

The yawing frame 16 is arranged on the surface of the pitching frame 15 on the image sensing element 11 side, and is able to move the second lens group 13 in the horizontal (X direction) direction. Fixing portions 16b that fix both ends of the pitching shaft 17, which is for allowing the pitching frame 15 mentioned previously to slide in the pitching (Y direction) direction, are formed on the yawing frame 16. The resin portion 16a for engaging the baffle portion 15b of the pitching frame 15 is integrally formed. A bearing 16c and a resin portion 16d in the yawing frame 16 are integrally formed. By inserting the yawing shaft 18 parallel to the X direction into the bearing 16c, the yawing frame 16 can be held by the second moving frame 2 so as to be slidable in the horizontal (X direction) direction. Fixing portions 2a that fix both ends of the yawing shaft 18 and a baffle portion 2b that engages the resin portion 16d are formed on the second moving frame 2 provided on the image sensing element 11 side of the yawing frame 16. The pitching frame 15 and the yawing frame 16 are arranged in the positions shown in FIG. 4 when attached to the second moving frame 2. Because the pitching shaft 17 and the yawing shaft 18 are arranged so as that their optical axis directions are approximately orthogonal, as shown in FIG. 4, the pitching frame 15 and the yawing frame 16 are arranged so as to be movable in directions approximately orthogonal to each other.

The laminated substrate 19 is fixed to the pitching frame 15, and laminated coils that drive the second lens group 13 are arranged integrally on the laminated substrate 19. The hall elements 21a and 21b are arranged on the laminated substrate 19 via the flexible printed circuit board 24.

The magnet 20 is configured by the two magnets 20a and 20b. The magnet 20 is arranged opposite the coils (flat coils) and the hall element 21 with the laminated substrate 19 sandwiched therebetween. The magnets 20a and 20b are both bipolar magnetized on one side. The back yokes 22a and 22b are fixed respectively to the opposite surface of the magnets 20a and 20b to the surface opposing the coils. The magnets 20a and 20b are adhered to the second moving frame 2, as well as to the back yokes 22a and 22b.

The hall element 21 is configured by the two hall elements 21a and 21b. The hall element 21 is able to detect the position of the second lens group 13 by detecting the magnetic flux of the magnet 20.

The opposing yoke 23 is arranged on the side opposite to the second moving frame 2 with the laminated substrate 19 sandwiched therebetween. The opposing yoke 23 is stepped using a pressing process at sites opposing the hall elements 21a and 21b, respectively. Indentation-type recesses 23a and 23b are formed as a result of the stepping. The indentation-type recess 23a is formed in a position opposing the hall element 21a, while the indentation-type recess 23b is formed in a position opposing the hall element 21b.

When current flows to the coils of the laminated substrate 19 in an image stabilizing apparatus in which the above configurations are fitted together, an electromagnetic force is generated by the action of the magnetic field produced by the magnet 20 and the current flowing to the coils. Specifically, the pitching frame 15 can be moved in the Y direction by controlling the current flowing to the coil disposed opposite the magnet 20a, and the yawing frame 16 can be moved in the X direction by controlling the current flowing to the coil disposed opposite the magnet 20b. Consequently, by simultaneously controlling the two currents, the pitching frame 15 and the yawing frame 16 can be moved simultaneously, and the second lens group 13 can be moved in both the X and Y directions substantially orthogonal to the optical axis.

Note that the specific image stabilizing control is performed as follows. The movement of the image sensing apparatus, which is the cause of camera shake, is detected by a movement detection means arranged in the image sensing apparatus. The amount and direction of movement of the second lens group 13 can be controlled as a result of the movement detection means generating a correction signal based on the amount and direction of the movement of the image sensing apparatus, and controlling the size of the current flowing to each of the two coils based on this correction signal.

[3. Positioning of Hall Element 21]

The hall element 21 is mounted on a land formed on the flexible printed circuit board 24. Specifically, by soldering together the terminal of the hall element 21 and the land of the flexible printed circuit board 24, power can be supplied to the hall element 21 via the flexible printed circuit board 24, and the signal of the hall element 21 can be extracted.

The smaller the gap between the magnet 20 and the opposing yoke 23, the higher the operating flux density of the magnet 20. This is advantageous since the electromagnetic force of the coils is higher the smaller the gap between the magnet 20 and the opposing yoke 23 with allowance for variation in component dimensions.

On the other hand, an end face of the hall element 21 protrudes from the surface of the flexible printed circuit board 24 with the hall element 21 mounted on the flexible printed circuit board 24. The hall element 21 also may protrude further from the surface of the flexible printed circuit board 24 when allowing for the fact that solder, for example, may harden into a lump when soldering the hall element 21 to the flexible printed circuit board 24. Consequently, if the gap between the hall element 21 and the opposing yoke 23 is too small, the hall element 21 or the solder may contact with the opposing yoke 23, causing operation failure.

In view of this, with embodiment 1, the gap between the laminated substrate 19 and the opposing yoke 23 in a vicinity of the hall element 21b can be partially widened by stepping the opposing yoke 23 to form the recess 23b at a site opposing the hall element 21b, as shown in FIGS. 5 and 6. Because the gap between the magnet 20b and the opposing yoke 23 can thereby be reduced, the electromagnetic force of the coil can be increased, and a sufficient gap can be secured between the hall element 21b and the opposing yoke 23.

Although not shown, an indentation-type recess 23a is also formed in the opposing yoke 23 at a site opposing the hall element 21a. By forming the indentation-type recess 23a, the gap between the laminated substrate 19 and the opposing yoke 23 in a vicinity of the hall element 21a can be partially widened. Because the gap between the magnet 20a and the opposing yoke 23 can thereby be reduced, the electromagnetic force of the coil can be increased, and a sufficient gap can be secured between the hall element 21a and the opposing yoke 23.

Note that when the hall element 21, the laminated substrate 19 and the magnet 20 are disposed in the stated order along the optical axis direction, as in embodiment 1, the hall element 21 is arranged on the opposite side of the laminated substrate 19 to the surface on which the magnet 20 is arranged, which means that the hall element 21 detects magnetic flux traveling from the opposite direction to the magnetic detection surface. It might appear that the detection of magnetic flux by the hall element 21 in this state may be disadvantageous, but by appropriately setting the distance between the magnetic detection portion of the hall element 21 and the magnet 20, operations can be performed without problem. At this time, the detection direction of the N and S poles of magnetic flux in the hall element 21 is reversed, although this is not problematic.

[4. Comparison of Configuration of Embodiment 1 with Configuration Disclosed in Prior Art Document]

Here, the configuration of the image stabilizing apparatus in embodiment 1 is compared with the configuration disclosed in a prior art document (JP 2005-221603A).

Figure 10:
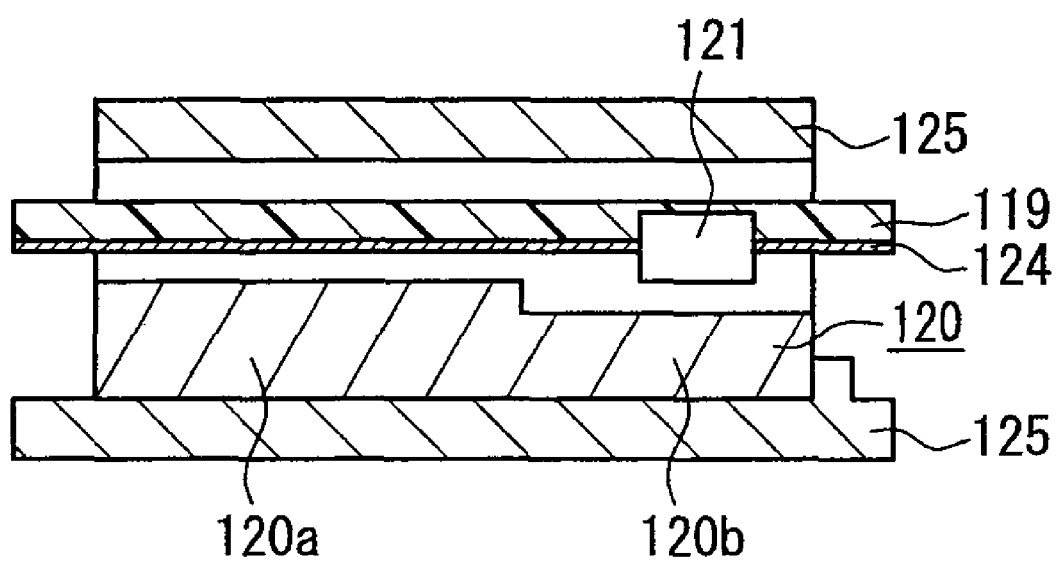
FIG. 10 is a cross-sectional view of an actuator portion of a conventional image stabilizing apparatus.

FIG. 10 is a cross-sectional view of an actuator portion of a conventional image stabilizing apparatus disclosed in the prior art document. Here, a comparison of the actuator portion of embodiment 1 shown in FIG. 5 with the actuator portion shown in FIG. 10 reveals at least the following three differences.

Difference 1: With the configuration of embodiment 1, the magnet 20 is a simple rectangular parallelepiped. In contrast, the magnet disclosed in the prior art document is stepped.

Difference 2: With the configuration of embodiment 1, indentation-type recesses 23a and 23b are formed in portions of the opposing yoke 23 that oppose the hall element 21. In contrast, portions opposing the hall element in the yoke are flat in the prior art document.

Difference 3: With the configuration of embodiment 1, the magnet 20, the laminated substrate 19 and the flexible printed circuit board 24 are disposed in the stated order. In contrast, the magnet, the laminated substrate, and the flexible printed circuit board in the prior art document are disposed in order of the magnet, the flexible printed circuit board and the laminated substrate.

[4-1. Detailed Description of Differences 1 and 2]

Firstly, making the magnet 20 into a simple rectangular parallelepiped, as with the configuration disclosed in embodiment 1, is a great advantage.

To step the magnet, as with the configuration disclosed in the prior art document, a common method involves machining off a portion of a magnet that has been processed into a rectangular parallelepiped to form steps. The shaved off portion of the magnet is discarded. However, manufacturing costs increase since the step of performing a stepping process is needed when the magnet is made with this method. Also, the relative cost of material for the magnet increases because a portion of the magnet is shaved off and discarded. Also, if the stepped magnet and the rectangular parallelepiped magnet are made with the same amount of magnetic material, fewer of the stepped magnets can be made compared with the rectangular parallelepiped magnet, resulting in a relative material cost increase.

On the other hand, the simple rectangular parallelepiped magnet 20, as shown in embodiment 1, has fewer processing steps, enabling manufacturing costs to be reduced. Also, since a portion of the magnet 20 is not shaved off and discharged, there is no increase in relative material costs. Also, since a larger number of magnets can be made with the same amount of magnetic material compared with the stepped magnet, relative material costs can be reduced.

In particular, magnetic material with a large energy product such as Nd—Fe—B or Sm—Co is used for magnets in image stabilizing apparatuses in order to obtain a large thrust with a very small magnet. However, the price of rare-earth metals such as Nd and Sm has increased appreciably in recent years, making it impossible to disregard the amount of magnetic material used no matter how small the difference.

In the case of the configuration shown in embodiment 1, the opposing yoke 23 is stepped (indentation-type recesses 23a, 23b), complicating the processing of the opposing yoke slightly in comparison with a flat opposing yoke. However, if the step in the opposing yoke is formed with a pressing process, it is only the die that is slightly complicated, whereas productivity and the amount of material used hardly changes, making it possible to produce opposing yokes at substantially equivalent cost.

As shown above, the total cost of the magnet 20 and the opposing yoke 23 can be reduced greatly by employing the configuration of embodiment 1.

[4-2. Detail Description Difference 3]

As disclosed in embodiment 1, the configuration in which the flexible printed circuit board 24 is arranged on the opposing yoke 23 side of the laminated substrate 19 has the following advantages.

The first advantage is the superior thrust characteristics of the configuration of embodiment 1. If the flexible printed circuit board is arranged on the magnet side of the laminated substrate, as with the configuration disclosed in the prior art document, the flexible printed circuit board is positioned between the magnet and the laminated substrate, increasing the distance between the magnet and the laminated substrate by the thickness of the flexible printed circuit board. In contrast, if the flexible printed circuit board 24 is arranged on the opposing yoke 23 side of the laminated substrate 19, as with embodiment 1, the distance between the magnet 20 and the laminated substrate 19 can be reduced.

Specifically, since the flexible printed circuit board usually has a thickness of approximately 0.1 mm, reducing the distance between the magnet 20 and the laminated substrate 19 by approximately 0.1 mm is possible if the flexible printed circuit board 24 is arranged on the opposing yoke 23 side of the laminated substrate 19.

Here, in order to confirm the thrust effect, an actuator having a laminated substrate 19 thickness of 0.5 mm and a gap from the surface of the magnet 20 to the surface of the opposing yoke 23 of 1.3 mm was prepared, and magnetic field analysis simulation carried out. A comparison of actuator thrust revealed that thrust improved by approximately 5% when the laminated substrate 19 was moved 0.1 mm closer to the surface of the magnet 20.

By arranging the flexible printed circuit board 24 on the opposing yoke 23 side of the laminated substrate 19, an actuator thereby can be realized with greater thrust for the same size.

A second advantage is in mounting the hall element. If the flexible printed circuit board is arranged on the magnet side of the laminated substrate, as with the configuration disclosed in prior art document, the body or terminal portion of the hall element protrudes from the flexible printed circuit board when the hall element is mounted on the flexible printed circuit board. To secure a gap between the hall element and the magnet at this time while preventing contact between the hall element and the opposing yoke, the magnet needs to be stepped or the gap between the magnet and the laminated substrate needs to be increased. The problems mentioned in 4-1 (Detailed Description of Difference 1 and 2) occur with this structure.

In contrast, if the flexible printed circuit board 24 is arranged on the opposing yoke 23 side of the laminated substrate 19, as shown in embodiment 1, the hall element 21 can be mounted without protruding from the magnet 20 side of the laminated substrate 19. Consequently, the magnet 20 neither needs to be stepped, nor does the gap between the laminated substrate 19 and the magnet 20 need to be increased, enabling the cost of magnet 20 to be reduced, as mentioned in 4-1 above. Also, an actuator with large thrust can be realized.

[5. Effects of the Embodiment and Related Matters]

With the configuration of embodiment 1, an actuator is obtained that realizes reduction in size, weight and cost while securing thrust as a result of steps (i.e., indentation-type recesses 23a and 23b) being formed in portions of the opposing yoke 23 that oppose the hall element 21.

Also, an image stabilizing apparatus with reduced size, weight and cost can realized as a result of being able to reduce the size of the coils and magnets with required performance maintained.

Note that although the back yoke 22 and the opposing yoke 23 are formed separately in the above embodiment, entirely the same effects are obtained even if the back yoke and the opposing yoke are formed integrally as a single component.

Embodiment 2

In embodiment 2, a configuration is shown that improves on the opposing yoke of embodiment 1.

Figure 7A:
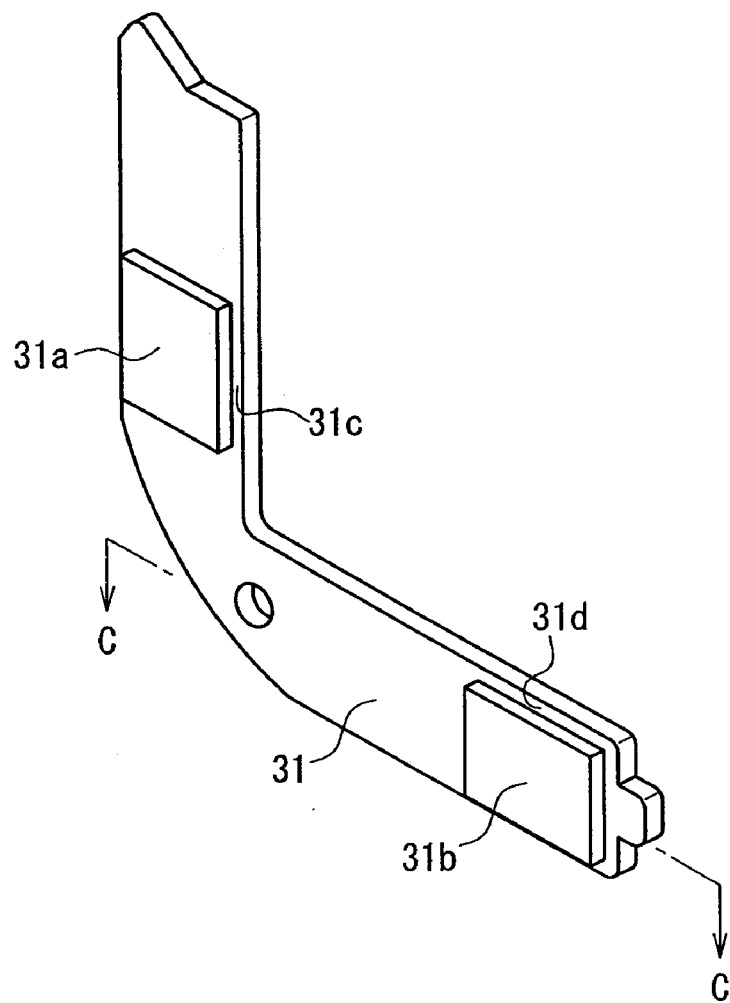
FIG. 7A is a perspective view of an opposing yoke according to an embodiment 2.
Figure 7B:
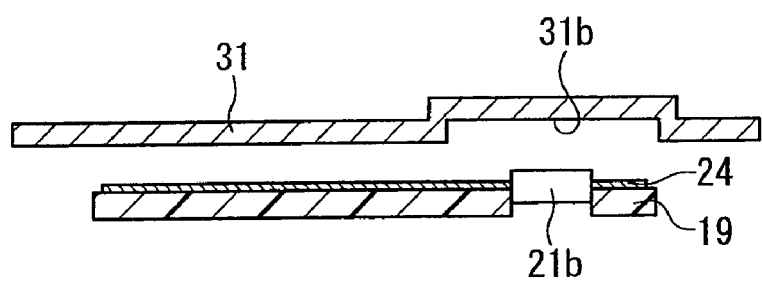
FIG. 7B is a cross-sectional view of a C-C portion of the opposing yoke according to embodiment 2.
Figure 8:
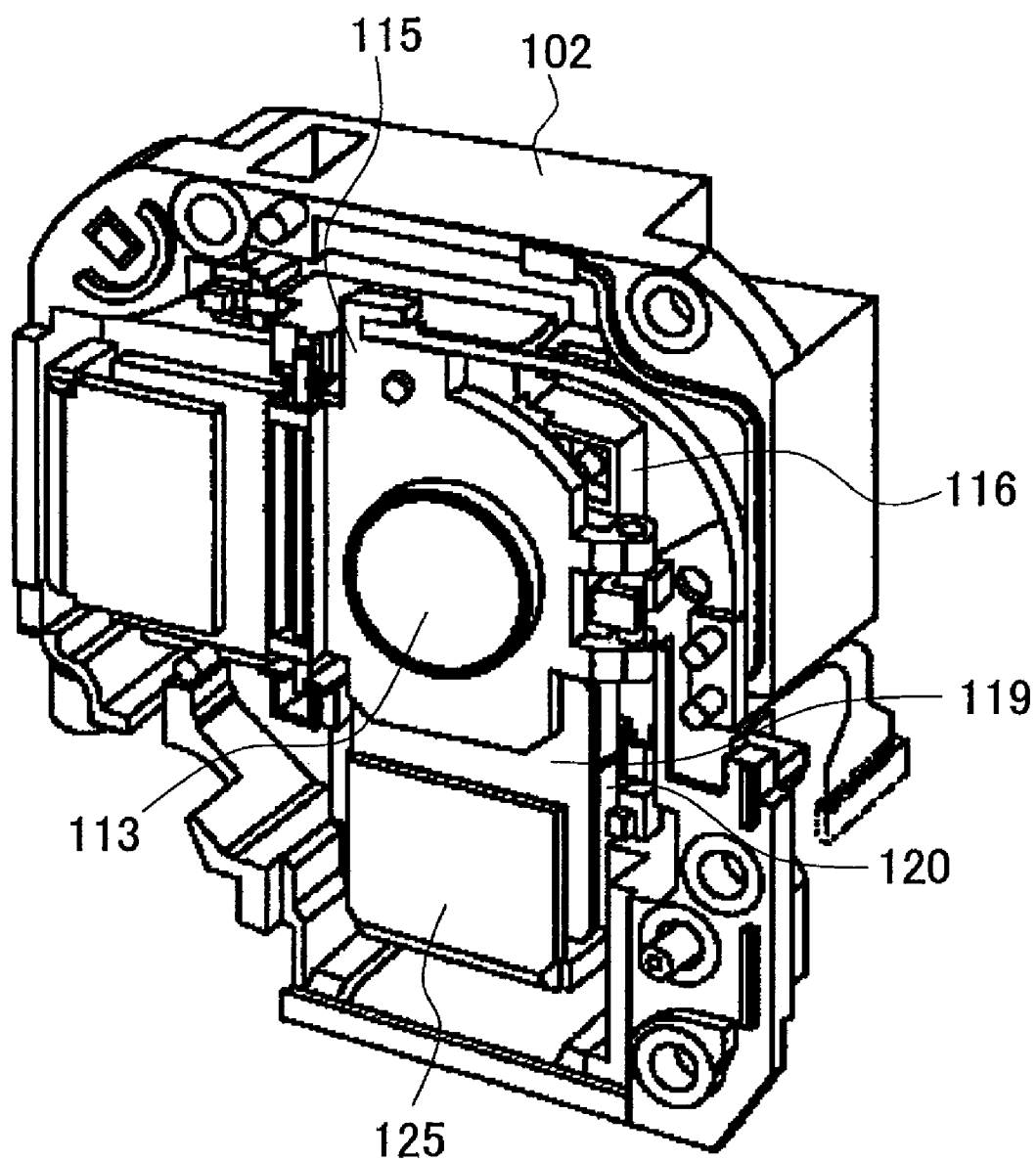
FIG. 8 is a perspective view of a conventional image stabilizing apparatus.
Figure 9:
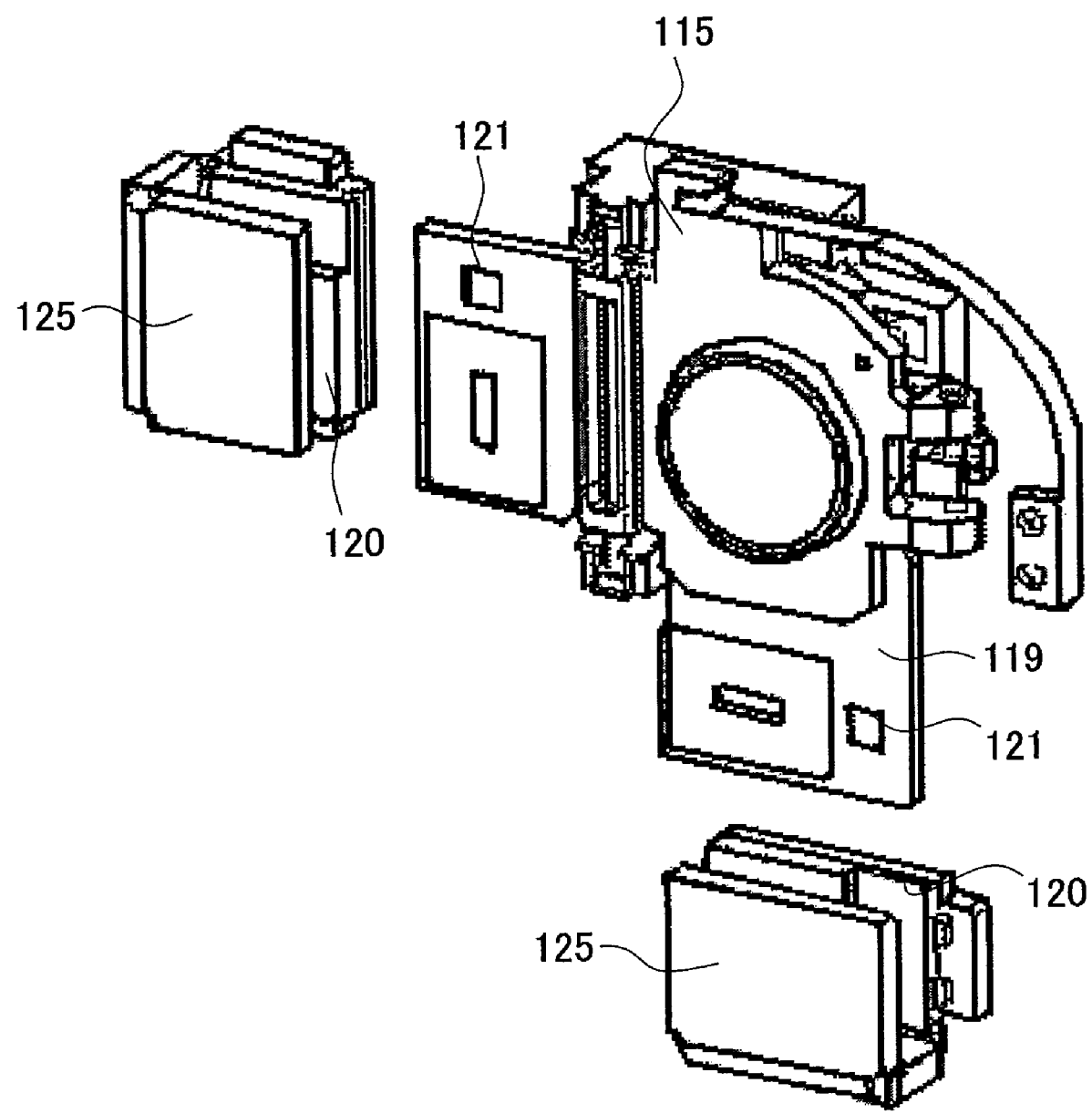
FIG. 9 is an exploded perspective view of a conventional image stabilizing apparatus.

FIG. 7A is a perspective view showing an opposing yoke according to embodiment 2. FIG. 7B is a cross-sectional view of a C-C portion of FIG. 7A. Note that the configuration of the image stabilizing apparatus of embodiment 2 is the same as embodiment 1 except for the opposing yoke 31.

The opposing yoke 23 shown in embodiment 1 is stepped (indentation-type recesses 23a, 23b) up to and including an outer periphery thereof, as shown in FIG. 5. That is, the indentation-type recesses 23a and 23b are formed in the surface of the opposing yoke 23 that opposes the hall element 21 up to the edge of the opposing yoke 23 on the short side.

The opposing yoke 31 shown in embodiment 2 is only stepped (recesses 31a, 31b) in a portion of the opposing yoke 31 that opposes the hall element 21, as shown in FIG. 7B. That is, flat portions 31c and 31d that are flush with the main surface of the opposing yoke 31 are formed on the periphery of the recesses 31a and 31b, as shown in FIG. 7A.

As a result of the configuration shown in FIGS. 7A and 7B, firstly the opposing yoke 31 is strengthened. Particularly if the opposing yoke is thin, the opposing yoke 23 is easily deformed by external forces when shaped as shown in embodiment 1. If shaped as shown in embodiment 2, however, the flat portions 31c and 31d forming the stepped portion act as reinforcing ribs, strengthening the opposing yoke.

Also, when shaped as shown in embodiment 1, the degree of flatness for the entire opposing yoke 23 sometimes is affected adversely if the stepped portion warps. However, with the configuration shown in embodiment 2, the degree of flatness of the opposing yoke 31 is secured easily by forming the flat portions 31c and 31d flush with the main surface of the opposing yoke 31.

With the configuration shown in embodiment 2, reduction in depth and weight of the image stabilizing apparatus can be realized by reducing the thickness of the opposing yoke 31 within a range that does not affect magnetic performance.

Reduction in size, weight and cost of an image stabilizing apparatus is possible according to embodiment 2 as shown above. A low cost lens barrel that is small and light can also be realized. Further, by employing the lens barrel in an image sensing apparatus, an image sensing apparatus that makes possible reduction in size, weight and cost can be realized.

Note that although stepping is only performed on portions of the opposing yoke 31 of embodiment 2 that oppose the hall element 21, contrary to this, similar effects are obtained even when the surface of the portion opposing the hall element 21 is kept as a reference surface, and stepping is only performed on the coil pattern portion.

Note that although the coils in embodiments 1 and 2 are fixed to the pitching frame 15 attached to the second lens group 13, and the pitching frame 15 is moved in the X and Y directions with the actuator, similar effects are obtained even when coils are also fixed to the yawing frame 16, and the yawing frame 16 is driven in the Y direction by the coils fixed to the pitching frame 15, and moved in the X direction by the coils provided on the yawing frame 16.

In embodiments 1 and 2, only one of the two actuators that move the second lens group 13 in the Y and X directions may be employed, and the other actuator may be used in another configuration.

[Remark 1]

An image stabilizing apparatus of the present invention comprises a correction lens that includes at least one lens and is for correcting subject image blur, a holding frame that holds the correction lens, and a correction unit frame that directly or indirectly holds the holding frame movably within a vertical plane to an optical axis of the lens. The correction unit frame includes at least a magnet, the holding frame includes at least a flat coil having a coil pattern for mobilizing the holding frame using a magnetic force of the magnet, and a position detection sensor that detects information for ascertaining a relative position of the holding frame and the correction unit frame using the magnetic force of the magnet, and the position detection sensor, the flat coil and the magnet are disposed in the stated order along an optical axis direction of the lens.

According to this configuration, sufficient thrust can be obtained even if a small magnet is used, since the gap between the position detection sensor and the opposing yoke can be secured even if the gap between the flat coil and the magnet is narrowed. Device miniaturization can therefore be achieved.

[Remark 2]

The image stabilizing apparatus of the present invention can be configured to further comprise an opposing yoke, and so that the opposing yoke is disposed opposite the position detection sensor on an opposite side to a side on which the magnet is disposed when viewed from the position detection sensor, and has a recess formed in a surface opposing the position detection sensor at least in a portion opposing the position detection sensor.

According to this configuration, miniaturization is possible since the gap between the opposing yoke and the substrate can be narrowed even if the position detection sensor protrudes from the substrate.

[Remark 3]

The image stabilizing apparatus of the present invention can be configured so that the recess is surrounded by a flat portion that is flush with a main surface of the opposing yoke.

According to this configuration, the opposing yoke can be strengthened.

[Remark 4]

The image stabilizing apparatus of the present invention can be configured so that the magnet is a rectangular parallelepiped.

According to this configuration, manufacturing costs can be cut due to the step of performing a stepping process being made redundant since the magnet need not be stepped. Relative material costs can also be cut.

[Remark 5]

The image stabilizing apparatus of the present invention can be configured so that the position detection sensor is mounted on a flexible substrate, and the flexible substrate is attached to a surface of the flat coil on an opposite side to a side on which the magnet is disposed.

According to this configuration, high thrust can be obtained because of being able to shorten the distance between the magnet and the flat coil.

[Remark 6]

A lens barrel of the present invention includes an image stabilizing apparatus that has a correction lens which includes at least one lens and is for correcting subject image blur, a holding frame that holds the correction lens, and a correction unit frame that directly or indirectly holds the holding frame movably within a vertical plane to an optical axis of the lens. The correction unit frame includes at least a magnet, the holding frame includes at least a flat coil having a coil pattern for mobilizing the holding frame using a magnetic force of the magnet, and a position detection sensor that detects information for ascertaining a relative position of the holding frame and the correction unit frame using the magnetic force of the magnet, and the position detection sensor, the flat coil and the magnet are disposed in the stated order along an optical axis direction of the lens.

According to this configuration, sufficient thrust can be obtained even if a small magnet is used, since the gap between the position detection sensor and the opposing yoke can be secured even if the gap between the flat coil and the magnet is narrowed. Device miniaturization therefore can be achieved.

[Remark 7]

An image sensing apparatus of the present invention includes an image stabilizing apparatus that has a correction lens which includes at least one lens and is for correcting subject image blur, a holding frame that holds the correction lens, and a correction unit frame that directly or indirectly holds the holding frame movably within a vertical plane to an optical axis of the lens. The correction unit frame includes at least a magnet, the holding frame includes at least a flat coil having a coil pattern for mobilizing the holding frame using a magnetic force of the magnet, and a position detection sensor that detects information for ascertaining a relative position of the holding frame and the correction unit frame using the magnetic force of the magnet, and the position detection sensor, the flat coil and the magnet are disposed in the stated order along an optical axis direction of the lens.

According to this configuration, sufficient thrust can be obtained even if a small magnet is used, since the gap between the position detection sensor and the opposing yoke can be secured even if the gap between the flat coil and the magnet is narrowed. Device miniaturization therefore can be achieved.

The present invention is applicable in an optical image stabilizing apparatus that includes a coil, a position detection sensor, and a magnet. Such an image stabilizing apparatus is mountable in a lens barrel used in an image sensing apparatus such as a digital still camera, a video camera, or a mobile telephone terminal with camera.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image stabilizing apparatus comprising:
   a correction lens that includes at least one lens and is for correcting subject image blur;
   a holding frame that holds the correction lens;
   a correction unit frame that directly or indirectly holds the holding frame movably within a vertical plane to an optical axis of the lens; and
   an opposing yoke, wherein
   the correction unit frame includes at least a magnet,
   the holding frame includes at least a flat coil having a coil pattern for moving the holding frame using a magnetic force of the magnet, and a magnetism detection sensor that detects the magnetic force of the magnet to ascertain a relative position of the holding frame and the correction unit frame,
   the magnetism detection sensor, the flat coil and the magnet are disposed in the stated order along an optical axis direction of the lens, and
   the opposing yoke is disposed opposite the magnetism detection sensor on an opposite side to a side on which the magnet is disposed when viewed from the magnetism detection sensor, and has an indentation-type recess formed in a surface opposing the magnetism detection sensor at least in a portion opposing the magnetism detection sensor;
   wherein the opposing yoke is positioned at a first end of the image stabilizing apparatus along the optical axis.

2. The image stabilizing apparatus according to claim 1, wherein the recess is surrounded by a flat portion that is flush with a main surface of the opposing yoke.

3. The image stabilizing apparatus according to claim 1, wherein the magnet is a rectangular parallelepiped.

4. The image stabilizing apparatus according to claim 1, wherein
   the magnetism detection sensor is mounted on a flexible substrate, and
   the flexible substrate is attached to a surface of the flat coil on an opposite side to a side on which the magnet is disposed.

5. A lens barrel comprising an image stabilizing apparatus, wherein the image stabilizing apparatus includes:
   a correction lens that includes at least one lens and is for correcting subject image blur;
   a holding frame that holds the correction lens;
   a correction unit frame that directly or indirectly holds the holding frame movably within a vertical plane to an optical axis of the lens; and
   an opposing yoke, wherein
   the correction unit frame includes at least a magnet,
   the holding frame includes at least a flat coil having a coil pattern for moving the holding frame using a magnetic force of the magnet, and a magnetism detection sensor that detects the magnetic force of the magnet to ascertain a relative position of the holding frame and the correction unit frame,
   the magnetism detection sensor, the flat coil and the magnet are disposed in the stated order along an optical axis direction of the lens, and
   the opposing yoke is disposed opposite the magnetism detection sensor on an opposite side to a side on which the magnet is disposed when viewed from the magnetism detection sensor, and has an indentation-type recess formed in a surface opposing the magnetism detection sensor at least in a portion opposing the magnetism detection sensor; and
   wherein the opposing yoke is positioned at a first end of the image stabilizing apparatus along the optical axis.

6. An image sensing apparatus comprising an image stabilizing apparatus, wherein the image stabilizing apparatus includes:
   a correction lens that includes at least one lens and is for correcting subject image blur;
   a holding frame that holds the correction lens;
   a correction unit frame that directly or indirectly holds the holding frame movably within a vertical plane to an optical axis of the lens; and an opposing yoke, wherein the correction unit frame includes at least a magnet, the holding frame includes at least a flat coil having a coil pattern for moving the holding frame using a magnetic force of the magnet, and a magnetism detection sensor that detects the magnetic force of the magnet to ascertain a relative position of the holding frame and the correction unit frame, the magnetism detection sensor, the flat coil and the magnet are disposed in the stated order along an optical axis direction of the lens, and the opposing yoke is disposed opposite the magnetism detection sensor on an opposite side to a side on which the magnet is disposed when viewed from the magnetism detection sensor, and has an indentation-type recess formed in a surface opposing the magnetism detection sensor at least in a portion opposing the magnetism detection sensor; and wherein the opposing yoke is positioned at a first end of the image stabilizing apparatus along the optical axis.

* * * * *